(12) United States Patent
Szul et al.

(10) Patent No.: US 11,377,460 B2
(45) Date of Patent: Jul. 5, 2022

(54) METHODS FOR ADJUSTING A POLYMER PROPERTY

(71) Applicant: Univation Technologies, LLC, Houston, TX (US)

(72) Inventors: John F. Szul, S. Charleston, WV (US); E. J. Markel, Kingwood, TX (US); R. Eric Pequeno, Baytown, TX (US); Bruce J. Savatsky, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 23 days.

(21) Appl. No.: 17/042,244

(22) PCT Filed: Mar. 20, 2019

(86) PCT No.: PCT/US2019/023107
§ 371 (c)(1),
(2) Date: Sep. 28, 2020

(87) PCT Pub. No.: WO2019/190848
PCT Pub. Date: Oct. 3, 2019

(65) Prior Publication Data
US 2021/0047355 A1    Feb. 18, 2021

Related U.S. Application Data

(60) Provisional application No. 62/649,031, filed on Mar. 28, 2018.

(51) Int. Cl.
*C08F 2/00* (2006.01)
*C08F 210/16* (2006.01)
*C08F 4/6592* (2006.01)
*C07F 17/00* (2006.01)

(52) U.S. Cl.
CPC .............. *C07F 17/00* (2013.01); *C08F 2/001* (2013.01); *C08F 4/65925* (2013.01); *C08F 210/16* (2013.01)

(58) Field of Classification Search
CPC .... C08F 2/001; C08F 4/65925; C08F 210/16; C08L 23/0815
See application file for complete search history.

(56) References Cited

U.S. PATENT DOCUMENTS

| | | | |
|---|---|---|---|
| 5,627,242 A | 5/1997 | Jacobsen et al. | |
| 6,936,675 B2* | 8/2005 | Szul | C08J 5/18 526/348.2 |
| 7,078,467 B1 | 7/2006 | Kolb et al. | |
| 2006/0136149 A1 | 6/2006 | Long et al. | |
| 2015/0005462 A1 | 1/2015 | Dudish et al. | |
| 2018/0118862 A1* | 5/2018 | Savatsky | C08L 23/0815 |

OTHER PUBLICATIONS

International Search Report & Written Opinion for related PCT Application PCT/US2019/023107, dated Jul. 5, 2019 (12 pgs).
International Preliminary Report on Patentability for related PCT Application PCT/US2019/023107, dated Oct. 8, 2020 (8 pgs).

* cited by examiner

*Primary Examiner* — Caixia Lu
(74) *Attorney, Agent, or Firm* — Brooks, Cameron & Huebsch, PLLC

(57) ABSTRACT

Embodiments of the present disclosure are directed towards methods of adjusting melt index and/or density utilizing a metallocene complex represented by Formula (I): wherein each n-Pr is n-propyl, and each X is independently $CH_3$, Cl, Br, or F.

6 Claims, 2 Drawing Sheets

METHODS FOR ADJUSTING A POLYMER PROPERTY

This application is a National Stage Application under 35 U.S.C. § 371 of International Application Number PCT/US2019/023107, filed Mar. 20, 2019 and published as WO 2019/190848 on Oct. 3, 2019, which claims the benefit to U.S. Provisional Application 62/649,031, filed Mar. 28, 2018, the entire contents of which are incorporated herein by reference in its entirety

FIELD OF DISCLOSURE

One or more embodiments of the present disclosure are directed towards methods for adjusting a polymer property; more specifically, one or more embodiments are directed towards methods utilizing a metallocene complex represented by Formula I:

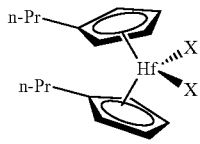

Formula I wherein each n-Pr is n-propyl, and each X is independently $CH_3$, Cl, Br, or F.

BACKGROUND

Polymers may be utilized for a number of products including films, among others. Polymers can be formed by reacting one or more types of monomer in a polymerization reaction. There is continued focus in the industry on developing new and improved materials and/or methods that may be utilized to form polymers.

SUMMARY

Figure 1:
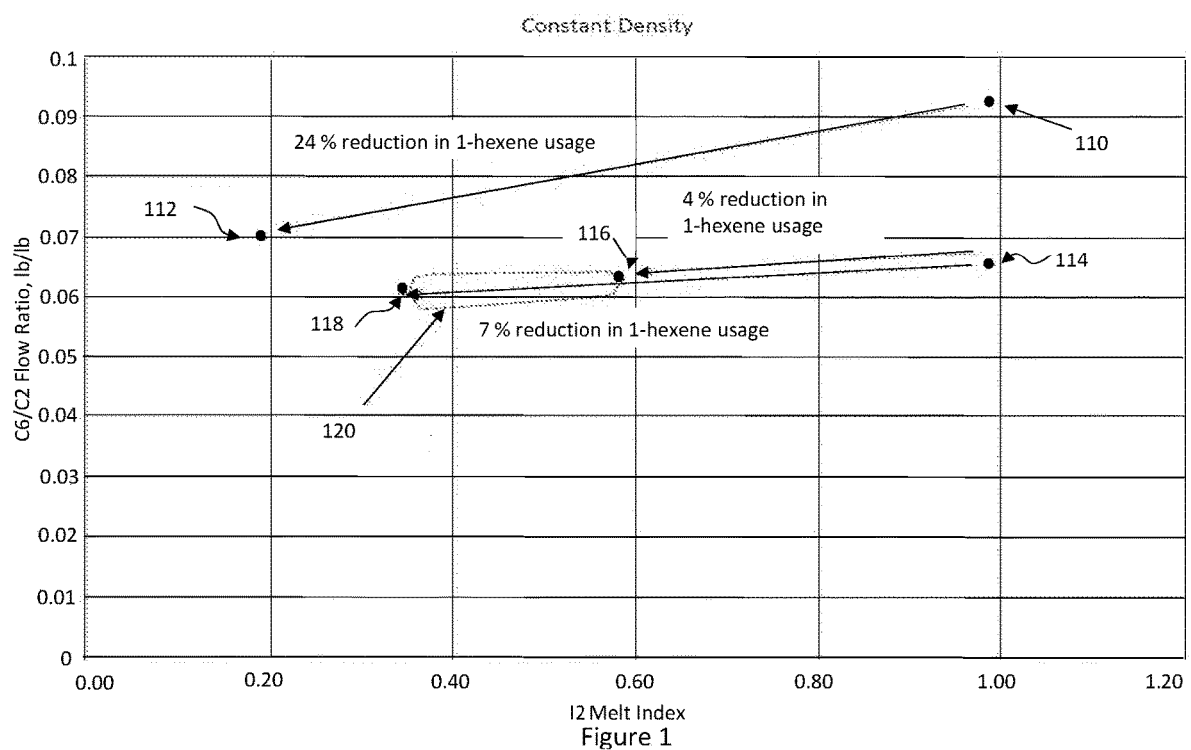
FIG. 1 illustrates a plot of $C_6/C_2$ flow ratio (lb/lb) vs $I_2$ melt index.

The present disclosure provides methods for adjusting melt index, the method including: activating a metallocene complex represented by Formula I:

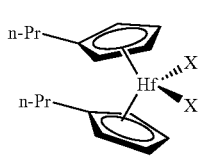

Formula I wherein each n-Pr is n-propyl, and each X is independently $CH_3$, Cl, Br, or F to provide an activated metallocene complex; contacting a monomer and a comonomer with the activated metallocene complex to produce a first polymer having a predetermined density and a first melt index, wherein the monomer is present at a monomer concentration and the comonomer is present at a comonomer concentration and hydrogen is present at a hydrogen concentration; and reducing the hydrogen concentration to produce a second polymer having the predetermined density and a second melt index that is lesser than the first melt index, wherein comonomer consumption is reduced from 10 to 35 percent on a mass basis.

The present disclosure provides methods for adjusting density, including: activating a metallocene complex represented by Formula I:

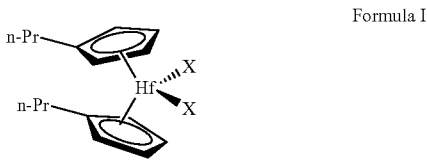

Formula I wherein each n-Pr is n-propyl, and each X is independently $CH_3$, Cl, Br, or F to provide an activated metallocene complex; contacting a monomer and a comonomer with the activated metallocene complex in the presence of hydrogen to produce a first polymer having a first density and a first melt index, wherein the hydrogen is present at a first hydrogen concentration, monomer is present at a monomer concentration, and the comonomer is present at a comonomer concentration; and reducing the first hydrogen concentration to a second hydrogen concentration while maintaining the monomer consumption to produce a second polymer having a second density that is lesser than the first density and a second melt index that is lesser than the first melt index.

One or more embodiments include reducing hydrogen from a first hydrogen concentration to a second hydrogen concentration, wherein the first hydrogen concentration is greater than the second hydrogen concentration.

One or more embodiments provide that the monomer is ethylene and the comonomer is 1-hexene.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Polymers can have a variety of properties, such as melt index, density, and melt index ratio, among others. Specific values for some polymer's properties may be achieved by adjustment of polymerization parameters such as monomer concentration, reaction temperature, comonomer flow ratio, hydrogen concentration, and/or reaction temperature. However, achieving particular values by adjustment of polymerization parameters for the polymer properties can differ when different catalysts are utilized.

Activated metallocenes may be utilized as catalysts for the production of a number of various polymers. Surprisingly, when activated, a metallocene complex of Formula I

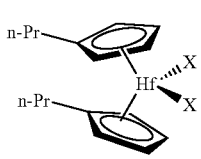

Formula I where each n-Pr is n-propyl, and each X is independently CH$_3$, Cl, Br, or F, has both an increased hydrogen response and an increased comonomer response, as compared to a metallocene complex of Formula II:

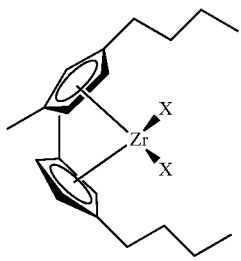

Formula II where each cyclopentadienyl ring is substituted 1-methyl, 3-butyl, and each X is independently CH$_3$, Cl, Br, or F. This increased hydrogen response and increased comonomer response have can have a significant impact on melt index and/or density.

The present disclosure provides methods for adjusting melt index. Methods for adjusting melt index can include activating the metallocene complex represented by Formula I:

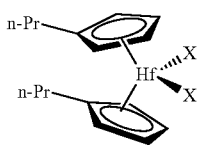

Formula I wherein each n-Pr is n-propyl, and each X is independently CH$_3$, Cl, Br, or F to provide an activated metallocene complex; contacting a monomer and a comonomer with the activated metallocene complex to produce a first polymer having a predetermined density and a first melt index, wherein the monomer is present at a monomer concentration and the comonomer is present at a comonomer concentration; and reducing hydrogen concentration and comonomer consumption to produce a second polymer having the predetermined density and a second melt index that is less than the first melt index. Utilizing the metallocene complex of Formula I, e.g., rather than the metallocene complex of Formula II, may advantageously provide that polymers having constant density and lower melt indexes may be produced at reduced comonomer consumption. Using less comonomer may be desirable for a number of product applications. It may also be desirable to reduce comonomer consumption for economic considerations as 1-hexene is more expensive than ethylene, for instance.

The present disclosure provides methods for adjusting density. Methods for adjusting density can include activating the metallocene complex represented by Formula I:

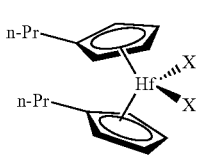

Formula I wherein each n-Pr is n-propyl, and each X is independently CH$_3$, Cl, Br, or F to provide an activated metallocene complex; contacting a monomer and a comonomer with the activated metallocene complex in the presence of hydrogen to produce a first polymer having a first density and a first melt index, wherein the hydrogen is present at a first hydrogen concentration, monomer is present at a monomer concentration, and the comonomer is present at a comonomer concentration; and reducing the hydrogen to a second hydrogen concentration while maintaining the monomer consumption to produce a second polymer having a second density that is lesser than the first density and a second melt index that is lesser than the first melt index. Utilizing the metallocene complex of Formula I, e.g., rather than the metallocene complex of Formula II, may advantageously provide that polymers having lower densities and/or melt indexes may be produced by reducing the concentration of hydrogen. Because other metallocene complexes, such as the metallocene complex of Formula II, can generate hydrogen during polymerization, the polymers having lower densities and/or melt indexes produced by reducing the concentration of hydrogen, i.e. hydrogen fed to the reactor, may not be achievable.

As mentioned, the methods disclosed herein utilize the metallocene complex represented by Formula I:

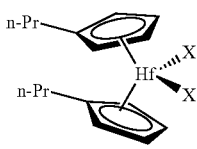

Formula I where each n-Pr is n-propyl, and each X is independently CH$_3$, Cl, Br, or F. The metallocene complex may be prepared by a known process, such as by repeated deprotanations/metallations of the aromatic ligands and introduction of the bridge and the central atom by their halogen derivatives. Known processes for preparing metallocenes are discussed in the Journal of Organometallic Chem., volume 288, (1985), pages 63-67, and EP-A-320762. Both documents are herein fully incorporated by reference. Additionally, the metallocene complex of Formula I and/or a corresponding activated metallocene complex may be obtained commercially, e.g., under the trade name XCAT™ VP-100, obtainable from Univation Technologies, LLC.

One or more embodiments of the present disclosure provide utilizing a supported metallocene complex. The supported metallocene complex can include the metallocene complex of Formula I and a support material. The supported metallocene complex may include other components known in the art.

The supported metallocene complex may be formed by a known process. For instance, the supported metallocene complex may be formed by a slurry process. The slurry can include components of the supported metallocene complex, i.e., the metallocene complex of Formula I and the support material, and optionally other known components. For example, the slurry may include an activator, such as aluminoxane and/or a modified alumoxane. The slurry can include an activator and/or or a supported activator. In one embodiment, the slurry includes a support material, an activator, and the metallocene complex of Formula I. A molar ratio of metal in the activator to metal in the metallocene complex of Formula I may be 1000:1 to 0.5:1, 300:1 to 1:1, or 150:1 to 1:1. Combining a metallocene complex, i.e. the metallocene complex of Formula I, with an activator can provide a catalyst, e.g. an activated metallocene complex.

The support material which may be any inert particulate carrier material known in the art, including, but not limited to, silica, fumed silica, alumina, clay, or talc, among other support materials. In one embodiment, the slurry contains silica and an activator, such as methyl aluminoxane ("MAO"), modified methyl aluminoxane ("MMAO"), as discussed further below.

As used herein, the terms "support material", "support", and "carrier" may be used interchangeably and refer to any support material, including a porous support material, such as talc, inorganic oxides, and inorganic chlorides. The metallocene complex of Formula I may be on the same as the activator, or the activator can be used in an unsupported form, or can be deposited on a support different from the metallocene complex of Formula I. This may be accomplished by any technique commonly used in the art.

The support material can include one or more inorganic oxides, for example, of Group 2, 3, 4, 5, 13, or 14 elements. The inorganic oxide can include, but is not limited to silica, alumina, titania, zirconia, boria, zinc oxide, magnesia, or combinations thereof. Illustrative combinations of inorganic oxides can include, but are not limited to, alumina-silica, silica-titania, alumina-silica-titania, alumina-zirconia, alumina-titania, and the like. The support material can be or include alumina, silica, or a combination thereof. In one embodiment, the support material is silica.

Suitable commercially available silica supports can include, but are not limited to, ES757, ES70, and ES70W available from PQ Corporation. Suitable commercially available silica-alumina supports can include, but are not limited to, SIRA® 1, SIRAL® 5, SIRAL® 10, SIRAL® 20, SIRAL® 28M, SIRAL® 30, and SIRAL® 40, available from SASOL®. Supports comprising silica gels with activators, such as MAOs, can be used. Suitable supports may also be selected from the CAB-O-SIL® materials available from Cabot Corporation and silica materials available from the Grace division of W.R. Grace & Company. Supports may also include polymers that are covalently bonded to a ligand on the catalyst. For example, two or more catalyst molecules may be bonded to a single polyolefin chain.

As used herein, the term "activator" refers to any compound or combination of compounds, supported, or unsupported, which can activate a complex or a catalyst component, such as by creating a cationic species of the catalyst component. For example, this can include the abstraction of at least one leaving group (the "X" group described herein) from the metal center of the complex/catalyst component, e.g. the metallocene complex of Formula I. The activator may also be referred to as a "co-catalyst".

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-$(CF_3)_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl)boron, a tris(perfluoronaphthyl)boron, tris(perfluorophenyl)aluminum, a tris(perfluoronaphthyl)aluminum, or any combinations thereof.

The activator may or may not bind directly to the support surface or may be modified to allow them to be bound to a support surface, e.g., via a tethering agent. Such tethering agents may be derived from groups that are reactive with surface hydroxyl species. Non-limiting examples of reactive functional groups that can be used to create tethers include aluminum halides, aluminum hydrides, aluminum alkyls, aluminum aryls, sluminum alkoxides, electrophilic silicon reagents, alkoxy silanes, amino silanes, boranes.

Aluminoxanes can be referred to as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3 A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

As used herein a "polymer" has two or more polymer units derived from monomers and/or comonomers. A "copolymer" is a polymer having two or more polymer units that are different from each other. Herein, polymer and copolymer may be used interchangeably. As used herein a "polymerization" and/or a "polymerization process" is a process that is utilized to form a polymer.

As used herein, when a polymer or copolymer is referred to as comprising, e.g., being formed from, an olefin, the olefin present in such polymer or copolymer is the polymerized form of the olefin. For example, when a polymer is said to have an ethylene content of 75 wt % to 85 wt %, it is understood that the polymer unit is derived from ethylene in the polymerization reaction and the derived units are present at 75 wt % to 85 wt %, based upon the total weight of the polymer.

One or more embodiments of present disclosure include polymers, i.e., polyethylene, made from a monomer, i.e., ethylene, and/or linear or branched higher alpha-olefin comonomers containing 3 to 20 carbon atoms. Examples of the comonomer include, but are not limited to, propylene, 1-butene, 1-pentene, 1-hexene, 4-methyl-1-pentene, 1-octene, 3,5,5-trimethyl-1-hexene, and combinations thereof. Examples of polymer include, but are not limited to, ethylene-based polymers, having at least 50 wt % ethylene, including ethylene-1-butene, ethylene-1-hexene, and ethylene-1-octene, among others.

The polymer can include from 50 to 95 wt % ethylene based on a total weight of the polymer. All individual values and subranges from 50 to 95 wt % are included; for example, the polymer can include from a lower limit of 50, 60, or 70 wt % ethylene to an upper limit of 95, 90, or 85 wt % ethylene based on the total weight of the polymer. The polymer can include from 5 to 50 wt % comonomer based on the total weight of the polymer. All individual values and subranges from 5 to 50 wt % are included; for example, the polymer can include from a lower limit of 5, 10, or 15 wt % comonomer to an upper limit of 50, 40, or 30 wt % comonomer based on the total weight of the polymer.

One or more embodiments of the present disclosure provide that the polymer can have a density of from 0.890 g/cm$^3$ to 0.970 g/cm$^3$. All individual values and subranges from 0.890 to 0.970 g/cm$^3$ are included; for example, the polymer can have a density from a lower limit of 0.890, 0.900, 0.910, or 0920 g/cm$^3$ to an upper limit of 0.970, 0.960, 0.950, or 0.940 g/cm$^3$. Density can be determined in accordance with ASTM D-792.

One or more embodiments of the present disclosure provide that the polymer can have a melt index (MI) or ($I_2$) as measured by ASTM-D-1238-E in the range from 0.01 dg/min to 1000 dg/min. For instance, the polymers can have a MI from 0.01 dg/min to 100 dg/min, from 0.1 dg/min to 50 dg/min, or from 0.1 dg/min to 10 dg/min.

One or more embodiments of the present disclosure provide that the polymer can have a Mn (number average molecular weight) from 5,000 to 75,000. All individual values and subranges from 5,000 to 75,000 are included; for example, the polymer can have a Mn from a lower limit of 5,000; 6,000; 7,000; 7,500; 8,000; or 8,500 to an upper limit of 75,000; 65,000; 55,000; 45,000; 35,000; 25,000; 24,000; 23,000; or 22,000. Mn can be determined by gel permeation chromatography (GPC), as is known in the art.

One or more embodiments of the present disclosure provide that the polymer can have a Mw (weight average molecular weight) from 60,000 to 110,000. All individual values and subranges from 60,000 to 110,000 are included; for example, the polymer can have a Mw from a lower limit of 60,000; 62,500; 63,000; or 63,500 to an upper limit of 110,000; 109,000; 108,000; or 107,000. Mw can be determined by GPC, as is known in the art.

One or more embodiments of the present disclosure provide that the polymer can have a Mz (z-average molecular weight) from 150,000 to 400,000. All individual values and subranges from 150,000 to 400,000 are included; for example, the polymer can have a Mz from a lower limit of 150,000; 155,000; 160,000; or 170,000 to an upper limit of 400,000; 375,000; 350,000; or 325,000. Mz can be determined by GPC, as is known in the art.

One or more embodiments of the present disclosure provide that the polymer can have a molecular weight distribution, determined as Mw/Mn (weight average molecular weight/number average molecular weight) from 3.00 to 8.00. All individual values and subranges from 3.00 to 8.00 are included; for example, the polymer can have a Mw/Mn from a lower limit of 3.00; 3.50; 4.00; or 4.50 to an upper limit of 8.00; 7.50; 7.00; or 6.50. Mw/Mn can be determined by GPC analysis, as is known in the art.

The polymers may be formed by suspension, slurry, and/or gas phase polymerization processes, using known equipment and reaction conditions, i.e. known polymerization conditions. Polymer formation is not limited to any specific type of polymerization system. As an example, polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C.

A number of embodiments of the present disclosure provide that the polymers may be formed via a gas phase polymerization system, at super-atmospheric pressures in the range from 0.07 to 68.9 bar (1 to 1000 psig), from 3.45 to 27.6 bar (50 to 400 psig), or from 6.89 to 24.1 bar (100 to 350 psig), and a temperature in the range from 30° C. to 130° C., from 50° C. to 110° C., from 55° C. to 120° C., or from 70° C. to 120° C. For a number of embodiments, operating temperatures may be less than 112° C. Stirred and/or fluidized bed gas phase polymerization systems may be utilized.

Generally, a conventional gas phase fluidized bed polymerization process can be conducted by passing a stream containing a monomer and a comonomer continuously through a fluidized bed reactor under reaction conditions and in the presence of a catalyst composition, e.g., a composition including the metallocene complex of Formula I and the activator and/or the corresponding activated metallocene complex of Formula I, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalyst composition and reactants may also be present in the gas stream. The polymerization system may include a single reactor or two or more reactors in series, for example.

Feed streams for the polymerization process may include monomer, comonomer, nitrogen, hydrogen, and may optionally include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single location or multiple and different locations.

For the polymerization process, catalyst, e.g., the metallocene complex of Formula I including the activator and/or the corresponding activated metallocene complex of Formula I, may be continuously fed to the reactor. A gas that is inert to the catalyst, such as nitrogen or argon, can be used to carry the catalyst into the reactor bed. In another embodiment, the catalyst can be provided as a slurry in mineral oil or liquid hydrocarbon or mixture such, as for example, propane, butane, isopentane, hexane, heptane or octane. The catalyst slurry may be delivered to the reactor with a carrier fluid, such as, for example, nitrogen or argon and/or a liquid such as for example isopentane or other $C_3$ to $C_8$ alkanes.

For the polymerization process, hydrogen may be utilized at a gas mole ratio of hydrogen to ethylene in the reactor that can be in a range of about 0.0 to 1.0, in a range of 0.00001 to 0.7, in a range of 0.00003 to 0.5, or in a range of 0.00005 to 0.3.

As mentioned, the present disclosure provides methods for adjusting melt index. The method includes activating, as discussed herein, the metallocene complex of Formula I

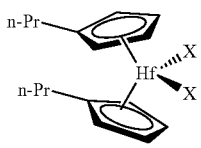

Formula I where each n-Pr is n-propyl, and each X is independently $CH_3$, Cl, Br, or F to provide an activated metallocene complex. The activated metallocene catalyst can be used for a polymerization process utilizing a monomer (at a monomer concentration) and a comonomer (at a first comonomer concentration) to produce a polymer having a predetermined density and a first melt index.

The method includes adjusting the first comonomer consumption. For instance, the first comonomer consumption may be decreased to provide a second comonomer consumption. Adjusting the first comonomer consumption to the second comonomer consumption provides that a second polymer may be produced utilizing the metallocene catalyst and the second comonomer consumption. The comonomer consumption may be reduced from 10 to 35 percent on a mass basis. All individual values and subranges from 10 to 35 percent on a mass basis are included; for example, the comonomer consumption may be reduced from a lower limit of 10, 11, 12 or 15 percent on a mass basis to an upper limit of 35, 33, 32, or 30 percent on a mass basis.

One or more embodiments of the present disclosure provide that the second polymer has the predetermined density, e.g., polymerization producing the first polymer and the polymerization producing the second polymer are constant density. As used herein "constant density" indicates that a first polymer and a second polymer each have respective densities that are within 0.002 g/cm³ of one another. For instance, if a first polymer has a density of 0.918 g/cm³, the second polymer may have a density of 0.918±0.002 g/cm³.

One or more embodiments of the present disclosure provide that the second polymer has a second melt index. For instance, when the first hydrogen concentration is decreased to provide the second hydrogen concentration; the resulting second melt index is less than the first melt index, e.g., the melt index is adjusted to the lower melt index. Advantageously, utilizing the metallocene complex of Formula I discussed herein can provide polymers having constant density and lower melt indexes with reduced comonomer consumption. Using less comonomer may be desirable for a number of product applications. It may also be desirable to reduce comonomer consumption for economic considerations as 1-hexene is more expensive than ethylene, for instance.

As mentioned, the present disclosure provides methods for adjusting density. The method includes activating, as discussed herein, the metallocene complex of Formula I:

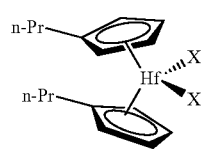

Formula I where each n-Pr is n-propyl, and each X is independently $CH_3$, Cl, Br, or F to provide an activated metallocene complex. The activated metallocene catalyst can be used for a polymerization process utilizing a monomer (at a monomer concentration) and a comonomer (at a comonomer concentration) in the presence of hydrogen, at a first hydrogen concentration, to produce a first polymer having a first density and a first melt index.

The method includes reducing hydrogen concentration to a second hydrogen concentration that is less than the first hydrogen concentration, while maintaining the monomer concentration and the comonomer concentration to produce a second polymer. One or more embodiments of the present disclosure provide for maintaining the comonomer consumption. As used herein "comonomer consumption" is determined from the comonomer to monomer mass flow ratio. The comonomer flow ratio is the feed rate of comonomer divided by the feed rate of monomer on a mass basis. The feed flows for the monomer and comonomer include all sources of monomer and comonomer feeds to the reactor cycle loop, including fresh feeds, recovered liquids, recovered gases or as components in other feed streams. The first polymer and second polymer each have respective comonomer/monomer flow ratios that are within ten percent of one another. For instance, if a first polymer is produced by a polymerization utilizing a comonomer/monomer flow ratio of 0.067, the second polymer is produced by a polymerization utilizing a comonomer/monomer flow ratio of 0.067±0.0067.

One or more embodiments of the present disclosure provide that the second polymer has a second density. For instance, when the hydrogen concentration is decreased to provide the second hydrogen concentration wherein the comonomer consumption is held constant; the resulting second density is less than the first density, e.g., the density is adjusted to the lower density.

Further, one or more embodiments of the present disclosure provide that the second polymer has a second melt index. For instance, when the hydrogen concentration is decreased to provide the second hydrogen concentration; the resulting second melt index is less than the first melt index, e.g., the melt index is adjusted to the lower melt index.

Utilizing the metallocene complex of Formula I, e.g., rather than the metallocene complex of Formula II, may advantageously provide that polymers having lower densities and/or lower melt indexes may be produced by reducing the concentration of hydrogen. Because other metallocene complexes, such as the metallocene complex of Formula II, can generate hydrogen during polymerization, the polymers having lower densities and/or lower melt indexes produced by reducing the concentration of hydrogen, i.e. hydrogen fed to the reactor, may not be achievable.

EXAMPLES

In the Examples, various terms and designations for materials are used including, for instance, the following:
XCAT™ VP-100 (activated metallocene complex of Formula I, obtained from Univation Technologies, LLC); XCAT™ HP-100 (activated metallocene complex of Formula II, obtained from Univation Technologies, LLC).

Melt index ($I_2$) was determined according to ASTM D-1238-E; density was determined according to ASTM D-792.

XCAT™ VP-100 was utilized for five polymerizations. The five polymerizations represent a two factor ($C_6/C_2$ consumption and $H_2$ ppm), two level designed experiment with a centerpoint. As ethylene partial pressure and reactor total pressure were held constant for all five parts, the $H_2$ ppm is indicative of the $H_2/C_2$ molar ratio. For the five polymerizations, a gas phase fluidized bed reactor was used which had a 0.57 m internal diameter and 4.0 m bed height and a fluidized bed composed of polymer granules. Fluidization gas was passed through the bed at a velocity of 1.8 to 2.2 ft/s. The fluidization gas exited the top of the reactor and passed through a recycle gas compressor and heat exchanger before re-entering the reactor below a distribution grid. A constant fluidized bed temperature was maintained by continuously adjusting the temperature of water on the shell side of a shell-and-tube heat exchanger. Gaseous feed streams of ethylene (monomer), nitrogen and hydrogen together with 1-hexene (comonomer) were introduced into a recycle gas line. The reactor was operated at a total pressure of approximately 2068 kPa gauge and vented to a flare to control pressure. Individual flow rates of ethylene, nitrogen, hydrogen and 1-hexene were adjusted to maintain desired targets. Concentrations of all gasses were measured using an on-line gas chromatograph. Ethylene partial pressure was held constant at 200 psi. The catalyst was fed semi-continuously at a rate to achieve a targeted polymer production rate in the range of 60 to 75 kg/hour. The fluidized bed was maintained at constant height by withdrawing a portion of the bed at a rate equal to the rate of formation of product. Product was removed semi-continuously via a series of valves into a fixed volume chamber. A nitrogen purge removed a significant portion of entrained and dissolved hydrocarbons in the fixed volume chamber. The product was further treated with a small stream of humidified nitrogen to deactivate any trace quantities of residual catalyst and/or cocatalyst. A feed of CA-300, commercially available from Univation Technologies, LLC, was fed into reactor using at a rate sufficient to produce about 30 ppmw in the final product. Polymerization conditions and/or product properties are reported in Table 1.

XCAT™ HP-100 was utilized for five polymerizations. The five polymerizations represent a two factor ($C_6/C_2$ consumption and $H_2$ ppm), two level designed experiment with a centerpoint. As ethylene partial pressure and reactor total pressure were held constant for all five parts, the $H_2$ ppm is indicative of the $H_2/C_2$ molar ratio. For the five polymerizations, a gas phase fluidized bed reactor was used which had a 0.35 m internal diameter and 2.3 m bed height and a fluidized bed composed of polymer granules. Fluidization gas was passed through the bed at a velocity of 1.8 to 2.2 ft/s. The fluidization gas exited the top of the reactor and passed through a recycle gas compressor and heat exchanger before re-entering the reactor below a distribution grid. A constant fluidized bed temperature was maintained by continuously adjusting the temperature of water on a shell side of a shell-and-tube heat exchanger. Gaseous feed streams of ethylene, nitrogen and hydrogen together with 1-hexene comonomer were introduced into a recycle gas line. The reactor was operated at a total pressure of about 2413 kPa gauge and vented to a flare to control the total pressure. Individual flow rates of ethylene, nitrogen, hydrogen and 1-hexene were adjusted to maintain gas composition targets. Concentrations of all gasses were measured using an on-line gas chromatograph. Ethylene partial pressure was held constant at 200 psi. The catalyst was fed semi-continuously at a rate to achieve a targeted polymer production rate in the range of 15 to 25 kg/hour. The fluidized bed was maintained at constant height by withdrawing a portion of the bed at a rate equal to the rate of formation of particulate product. Product was removed semi-continuously via a series of valves into a fixed volume chamber. A nitrogen purge removed a significant portion of entrained and dissolved hydrocarbons in the fixed volume chamber. After purging, the product was discharged from the fixed volume chamber into a fiber pack for collection. The product was further treated with a small stream of humidified nitrogen to deactivate any trace quantities of residual catalyst and/or cocatalyst. Polymerization conditions and/or product properties are reported in Table 2.

TABLE 1

| | $C_6/C_2$ flow ratio (lb/lb) | $H_2$ concentration (ppmv) | $I_2$ Melt index (dg/min) | Density (g/cm³) |
|---|---|---|---|---|
| Polymerization 1 XCAT ™ VP-100 | 0.0389 | 163 | 1.31 | 0.9287 |
| Polymerization 2 XCAT ™ VP-100 | 0.0389 | 290 | 5.72 | 0.9339 |
| Polymerization 3 XCAT ™ VP-100 | 0.0660 | 224 | 1.06 | 0.9231 |
| Polymerization 4 XCAT ™ VP-100 | 0.0937 | 172 | 0.19 | 0.9134 |
| Polymerization 5 XCAT ™ VP-100 | 0.0921 | 290 | 0.99 | 0.9172 |

TABLE 2

| | $C_6/C_2$ flow ratio (lb/lb) | $H_2$ concentration (ppmv) | $I_2$ Melt index (dg/min) | Density (g/cm³) |
|---|---|---|---|---|
| Polymerization 1 XCAT ™ HP-100 | 0.065 | 115 | 1.07 | 0.9180 |
| Polymerization 2 XCAT ™ HP-100 | 0.035 | 114 | 1.64 | 0.9337 |
| Polymerization 3 XCAT ™ HP-100 | 0.035 | 219 | 5.62 | 0.9367 |
| Polymerization 4 XCAT ™ HP-100 | 0.065 | 222 | 3.40 | 0.9201 |
| Polymerization 5 XCAT ™ HP-100 | 0.050 | 166 | 2.45 | 0.9277 |

Regression analysis, based upon the XCAT™ VP-100 Polymerizations 1-5, was utilized to provide the following equations:

$$\text{Ln(Melt Index)} = -0.4276 + 0.0124(H_2 \text{ ppm}) - 35.1929\left(\frac{C_6}{C_2} \text{ flow ratio}\right) \quad \text{Equation 1}$$

$$\text{Density} = 0.9351 + 3.455e-5(H_2 \text{ ppm}) - 0.2989\left(\frac{C_6}{C_2} \text{ flow ratio}\right) \quad \text{Equation 2}$$

Regression analysis, based upon the XCAT™ HP-100 Polymerizations 1-5, was utilized to provide the following equations:

$$\text{Ln(Melt Index)} = \quad\quad\quad\quad\quad\quad\quad\quad\quad\quad\quad \text{Equation 3}$$
$$-0.1879 + 0.0112(H_2\text{ ppm}) - 16.2436\left(\frac{C_6}{C_2}\text{ flow ratio}\right)$$

$$\text{Density} = \quad\quad\quad\quad\quad\quad\quad\quad\quad\quad\quad\quad\quad \text{Equation 4}$$
$$0.9502 + 2.395e - 5(H_2\text{ ppm}) - 0.5399\left(\frac{C_6}{C_2}\text{ flow ratio}\right)$$

FIG. 1 illustrates a plot of $C_6/C_2$ flow ratio (lb/lb) vs $I_2$ melt index generated utilizing Equation 1 and Equation 3. FIG. 1 illustrates Example 1, a method for adjusting melt index as disclosed herein, which utilized XCAT™ VP-100. FIG. 1 also illustrates Comparative Example A, where comonomer concentrations were reduced, which utilized XCAT™ HP-100.

For Example 1 and Comparative Example A, a predetermined density of 0.918 g/cm³ was utilized, the comonomer concentrations were reduced to provide respectively lower melt indexes; hydrogen concentrations were simultaneously reduced to maintain the predetermined density as constant.

As shown in FIG. 1, a polymerization corresponding to a $C_6/C_2$ flow ratio of approximately 0.092 provided a polymer 110 having a melt index of approximately 0.98 dg/min; the polymerization corresponded to a $H_2$ concentration of approximately 296 ppmv. For Example 1, the $C_6/C_2$ flow ratio was reduced from the concentration used to produce polymer 110 to produce polymer 112, which corresponded to a $C_6/C_2$ flow ratio of approximately 0.070, a $H_2$ concentration of approximately 100 ppmv, and the polymer 112 having a melt index of approximately 0.19 dg/min.

As shown in FIG. 1, a polymer 114 corresponded to a $C_6/C_2$ flow ratio of approximately 0.065 and a melt index of approximately 0.99 dg/min; the polymerization corresponded to a $H_2$ concentration of approximately 110 ppmv. For Comparative Example A, the $C_6/C_2$ flow ratio was reduced for polymer 116. Polymer 116 corresponded to a $C_6/C_2$ flow ratio of approximately 0.063, a $H_2$ concentration of approximately 60 ppmv, and a melt index of approximately 0.58 dg/min. Comparative Example A was extended to polymer 118 with a corresponding $H_2$ concentration of approximately 10 ppmv; however, polymers within area 120 are not practically feasible because the XCAT™ HP-100 generates hydrogen during polymerization. As such, the $H_2$ concentration of approximately 60 ppmv associated with polymer 116 can be considered a lower limit for hydrogen concentration when utilizing XCAT™ HP-100.

The plots of FIG. 1 illustrate that utilizing the metallocene complex of Formula I, i.e. XCAT™ VP-100, may advantageously provide that polymers having constant density and lower melt indexes may be produced by reducing the comonomer concentration. Further advantageously, the plots of FIG. 1 illustrate that the comonomer reduction of Example 1 was approximately 24%, as compared to a comonomer reduction of approximately 4% for Comparative Example A. The improved, i.e. greater, comonomer reduction of Example 1, as compared to Comparative Example A, may be desirable for a number of product applications. Using less comonomer may be desirable for overall plant economics as 1-hexene is more expensive than ethylene, for instance.

Figure 2:
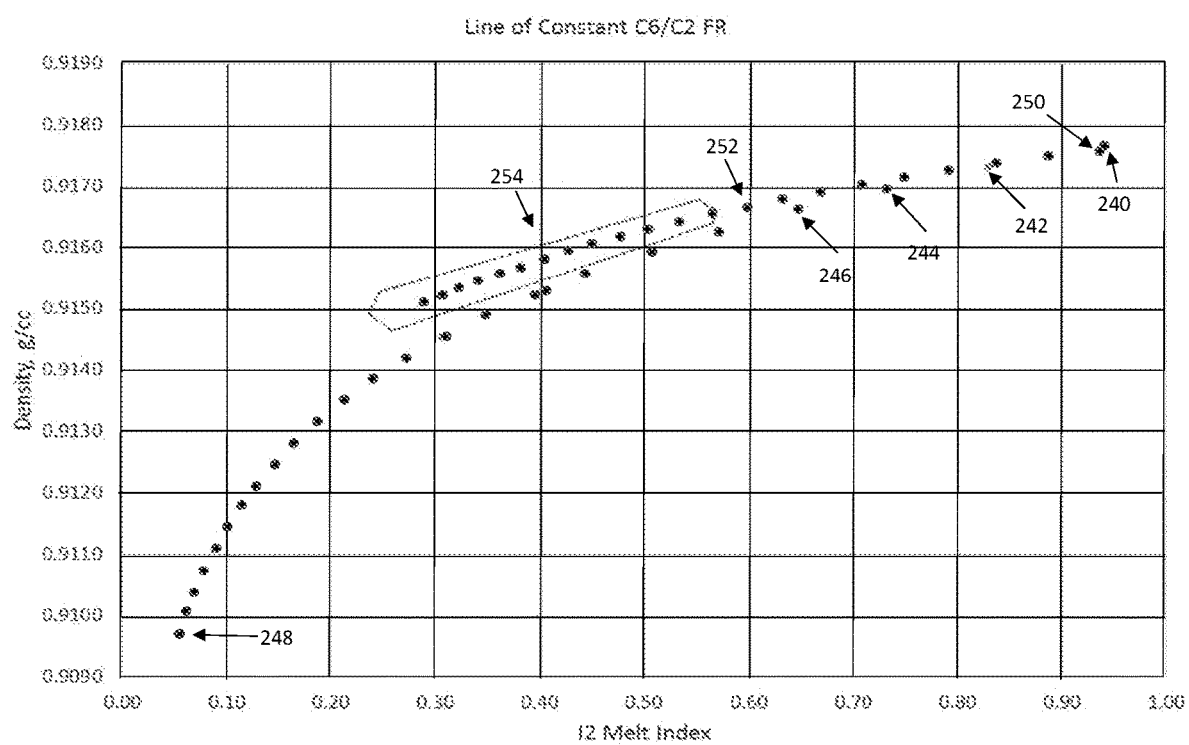
FIG. 2 illustrates a plot of density (g/cm$^3$) vs $I_2$ melt index.

FIG. 2 illustrates a plot of density (g/cm³) vs $I_2$ melt index (dg/min) generated utilizing Equations 1-4. FIG. 1 illustrates Example 2, a method for adjusting density as disclosed herein, which utilized XCAT™ VP-100. FIG. 2 also illustrates Comparative Example B, where hydrogen concentrations were reduced, which utilized XCAT™ HP-100. For Example 2 and Comparative Example B the respective $C_6/C_2$ flow ratios were maintained as constants at approximately 0.092 lb/lb and 0.065 lb/lb respectively.

As shown in FIG. 2, a polymer 240 corresponded to a melt index of approximately 0.94 dg/min and a density of approximately 0.9176 g/cm³; polymer 240 corresponded to a $H_2$ concentration of approximately 290 ppmv.

For Example 2, the $H_2$ concentration was reduced from polymerization 240 to polymerizations 242, 244, 246, and 248. Polymer 242 corresponded to a $H_2$ concentration of approximately 280 ppmv, a density of approximately 0.9173 g/cm³, and melt index of approximately 0.83 dg/min; polymer 244 corresponded to a $H_2$ concentration of approximately 270 ppmv, and a density of approximately 0.9169 g/cm³, and melt index of approximately 0.73 dg/min; polymer 246 corresponded to a $H_2$ concentration of approximately 260 ppmv, and a density of approximately 0.9166 g/cm³, and melt index of approximately 0.65 dg/min; polymerization 248 corresponded to a $H_2$ concentration of approximately 60 ppmv, and a density of approximately 0.9097 g/cm³, and melt index of approximately 0.05 dg/min.

As shown in FIG. 2, a polymer 250 corresponded to a melt index of approximately 0.94 dg/min and a density of approximately 0.9176 g/cm³; polymer 250 corresponded to a $H_2$ concentration of approximately 105 ppmv. For Comparative Example B, which utilized XCAT™ HP-100, the $H_2$ concentration was reduced from polymer 250 to polymer 252, which corresponded to a melt index of approximately 0.60 dg/min and a density of approximately 0.9166 g/cm³; polymer 252 corresponded to a $H_2$ concentration of approximately 60 ppmv. Comparative Example B was extended to polymers within area 254, which are not practically feasible because the XCAT™ HP-100 generates hydrogen during polymerization. As such, the $H_2$ concentration of approximately 60 ppmv associated with polymer 252 can be considered lower limit for hydrogen concentration when utilizing XCAT™ HP-100.

The plots of FIG. 2 illustrate that utilizing the metallocene complex of Formula I, i.e. XCAT™ VP-100, may advantageously provide that polymers having a reduced density may be produced by while maintaining the comonomer consumption, e.g., the $C_6/C_2$ flow ratios. Further advantageously, the plots of FIG. 2 illustrate that polymers having a reduced melt index may be produced while maintaining the monomer concentration and comonomer concentration, e.g., the $C_6/C_2$ flow ratios. Utilizing the metallocene complex of Formula I, e.g., XCAT™ VP-100, may advantageously provide that polymers having lower densities and/or lower melt indexes may be produced by reducing the concentration of hydrogen. Because utilizing other metallocene complexes, e.g., XCAT™ HP-100, can generate hydrogen during polymerization, the polymers having lower densities, e.g., such as densities below approximately 0.9168 g/cm³ as illustrated by FIG. 2, and/or lower melt indexes, e.g., such as melt indexes below approximately 0.0.60 dg/min, as illustrated by FIG. 2, produced by reducing the concentration of hydrogen, i.e. hydrogen fed to the reactor, may not be achievable, as illustrated by the plots of Table 2.

What is claimed:

1. A method for adjusting melt index, the method comprising:

activating a metallocene complex represented by Formula I:

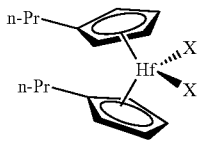

Formula I wherein each n-Pr is n-propyl, and each X is independently $CH_3$, Cl, Br, or F to provide an activated metallocene complex;

contacting ethylene and a comonomer with the activated metallocene complex to produce a first polymer having a predetermined density from 0.890 g/cm³ to 0.970 g/cm³ and a first melt index from 0.01 dg/min to 1000 dg/min, wherein the ethylene is present at a concentration from 50 wt % to 95 wt % and the comonomer is present at a comonomer concentration from 5 wt % to 50 wt % and hydrogen s present at a gas mole ratio of hydrogen to the monomer from 0.0001 to 0.7; and reducing the hydrogen concentration to produce a second polymer having the predetermined density and a second melt index that is lesser than the first melt index, wherein comonomer concentration is reduced 10 to 35 percent on a mass basis during polymerization.

2. A method for adjusting density, the method comprising:

activating a metallocene complex represented by Formula I:

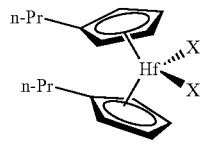

Formula I wherein each n-Pr is n-propyl, and each X is independently $CH_3$, Cl, Br, or F to provide an activated metallocene complex;

contacting ethylene and a comonomer with the activated metallocene complex in the presence of hydrogen to produce a first polymer having a first density from 0.890 g/cm³ to 0.970 g/cm³ and a first melt index from 0.01 dg/min to 1000 dg/min, wherein the hydrogen is present at a first gas mole ratio of hydrogen to the monomer from 0.0001 to 0.7, ethylene is present at a concentration from 50 wt % to 95 wt %, and the comonomer is present at a comonomer concentration from 5 wt % to 50 wt %; and reducing the first hydrogen concentration to a second hydrogen concentration while maintaining the ethylene consumption to produce a second polymer having a second density that is lesser than the first density and a second melt index that is lesser than the first melt index.

3. The method of claim 1, wherein the hydrogen concentration is reduced from 10 to 40 weight percent.

4. The method of claim 1, wherein the comonomer is 1-hexene.

5. The method of claim 2, wherein the hydrogen concentration is reduced from 10 to 40 weight percent.

6. The method of claim 2, wherein the comonomer is 1-hexene.

* * * * *